United States Patent [19]

Higgins

[11] Patent Number: 4,466,459

[45] Date of Patent: Aug. 21, 1984

[54] PNEUMATIC TIMER WITH SPIRAL THROTTLE

[75] Inventor: Godfrey A. Higgins, Camborne, England

[73] Assignee: Compair Maxam Limited, Redruth, England

[21] Appl. No.: 416,511

[22] Filed: Sep. 9, 1982

[30] Foreign Application Priority Data

Oct. 12, 1981 [GB] United Kingdom ................. 8130752

[51] Int. Cl.[3] ............................................. F16K 31/12

[52] U.S. Cl. .......................... 137/624.11; 137/625.66; 251/126; 138/42

[58] Field of Search ...................... 137/624.11, 625.66, 137/625.27; 251/126; 138/42; 92/60.5

[56] References Cited

U.S. PATENT DOCUMENTS

| | | | |
|---|---|---|---|
| 1,964,300 | 6/1934 | Perry et al. | 138/42 |
| 1,983,213 | 12/1934 | Brady et al. | 251/126 |
| 1,983,227 | 12/1934 | Hall et al. | 138/42 |
| 2,506,152 | 5/1950 | Hunter | 251/126 |
| 3,343,558 | 9/1967 | De Vita | 137/624.11 |

FOREIGN PATENT DOCUMENTS

| | | | |
|---|---|---|---|
| 1225019 | 6/1960 | France | 251/126 |

*Primary Examiner*—Martin P. Schwadron
*Assistant Examiner*—Mark Malkin
*Attorney, Agent, or Firm*—Sughrue, Mion, Zinn, Macpeak and Seas

[57] ABSTRACT

A pneumatic timer has a cylinder (3) containing a piston (4), which is movable upwards and downwards to vary the volume of a chamber (11) below the piston by means of a screw-threaded spindle (7) and a screw-threaded sleeve (9) which is rotatable by a knob (10). Air is supplied to the chamber (11) via an inlet (26) and a long spiral groove (17, FIG. 2) formed in a disc (14), which is incorporated in the piston (4). When the air pressure in the chamber (11) reaches a predetermined value, the valve (5) is actuated by a diaphragm (12) and the time taken for this to happen from initiation of the air supply is varied by moving the piston (4) to alter the volume of the chamber (11). The air flow into the chamber (11) is accurately metered by the groove (17) and may be made much smaller than that through a variable orifice as is done in existing pneumatic timers. The timer is accordingly more accurate and provides longer time intervals than can existing timers of a similar size.

13 Claims, 2 Drawing Figures

PNEUMATIC TIMER WITH SPIRAL THROTTLE

Figure 1:
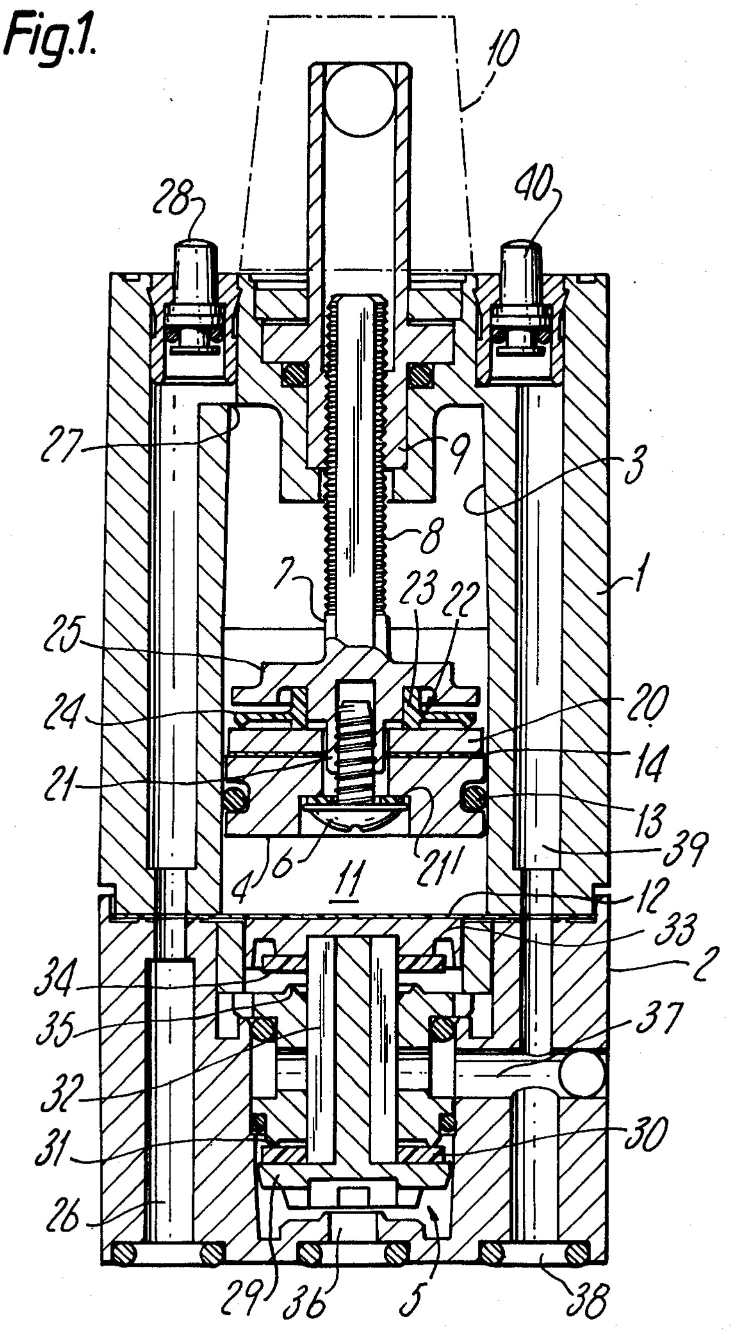

This invention relates to variable pneumatic timers for use, for example, in pneumatic logic circuits.

Timers with which the invention is concerned comprise an air chamber having an inlet for the supply of air, a throttling device in the inlet to control the rate of air flow into the chamber, and a member which is mounted in the wall of the chamber and is movable to operate a valve when a predetermined air pressure is reached in the chamber.

The valve, which may be a logic YES unit, is operated at a predetermined, but adjustable, time after a signal in the form of the initiation of a supply of air under pressure, has been transmitted to the timer.

In an existing form of timer of the type just described, the air chamber is of constant volume and the throttling device is in the form of an orifice of adjustable size. The air under pressure flows into the chamber at a rate which is determined by the size to which the orifice is set and thus reduction of the size of the orifice increases the time delay between receipt of the signal, that is the start of supply of air under pressure, and operation of the valve, and increase of the size of the orifice decreases the time delay.

This existing form of timer operates reasonably well, but it has the disadvantages that the variable sized orifice is difficult and therefore expensive to manufacture and it is even more difficult to manufacture the orifices consistently so that it is difficult to produce a number of similar timers with the same characteristics by series production techniques.

Further, the sensitivity with which the delay period can be set is not very great because it is difficult to construct the orifice in such a way that its area can be adjusted in a sensitive manner.

The aim of the present invention is to overcome these disadvantages and to provide a pneumatic timer which, when made of much the same overall size as an existing timer of the form just described, can provide a substantially larger maximum time delay and also a time delay which can be adjusted more accurately between minimum and maximum values.

According to this invention, a variable pneumatic timer as initially described is characterized in that the chamber is provided in a cylinder fitted with a piston, the position of which is adjustable to vary the volume of the chamber, and the throttling device comprises an elongated substantially spiral open-ended passage formed by a substantially spiral groove in a flat faced member and a seal applied over the flat face to enclose the groove.

The use of a chamber of variable size makes it possible to use a throttling device of the form just described which provides a constant rate of flow into the chamber and this form of throttling device has great advantages over the variable sized orifice which was previously used.

Firstly, because the groove follows a spiral path, a very long groove can be provided in a small component so that the rate of air flow through the groove may be made vary small. This makes it possible to obtain a much longer time delay than could be obtained with the previous form of timer without increasing the overall size of the timer. For example, in one of the previous forms of timer, the maximum time delay when the orifice was set to its maximum size was 10 seconds, whereas in one example of a timer in accordance with the present invention of much the same overall size, a maximum time delay of 30 seconds can be obtained. By decreasing the cross sectional area and increasing the overall length of the groove, it is possible to obtain with a timer of the same overall size an even longer time delay of up to several minutes. The maximum time delay which can be obtained varies in dependence upon the minimum time delay which is required and is dependent upon not only the length and cross-sectional area of the groove and upon the maximum volume of the chamber, but also upon the pressure of the air supplied to the spiral groove and the magnitude of the predetermined air pressure in the chamber at which the valve is operated.

Further, to produce a predetermined maximum time delay with a timer of predetermined overall dimensions and a predetermined air supply pressure to the timer, the spiral groove, owing to its length, can be made of a substantially greater cross-sectional area than the area of the orifice required in a timer of the previously existing form. Because of the greater cross-sectional area of the groove, the risk of blockage is greatly reduced.

Preferably the flat faced member is a disc which is incorporated in the piston. A signal in the form of the supply of air under pressure to the inlet is then applied to one side of the piston and the air flows through the piston via the spiral groove into the chamber on the other side of the piston.

The movable member, which operates the valve, is preferably in the form of a diaphragm which extends over one end of the cylinder in which the piston is movable. Thus the chamber is bounded at one end by the piston and at the other end by the diaphragm. The diaphragm, which is preferably made of elastomeric synthetic resin material acts on a valve member, movement of which operates the valve.

Preferably the valve is built into the end of a housing which contains the cylinder and the valve is exposed to a further supply of air under pressure which tends to hold the valve either closed or open against the pressure in the chamber acting on the diaphragm. The valve is then either opened or closed respectively, according to whether it is a NOT valve or a YES valve, under the control of the timer and operation of the valve occurs when the pressure in the chamber reaches a predetermined fraction of the pressure of the further air supply acting on the valve closure member.

If the valve is a YES valve, the valve member remains open after the pressure in the chamber has reached a predetermined value so long as the signal, which consists of the supply of air to the chamber inlet, is maintained. The valve is then closed again as soon as the supply of air to the chamber inlet ceases. To enable this to happen, it is necessary for the air under pressure in the chamber to be vented rapidly and for this purpose, the chamber is preferably provided with an outlet through which venting takes place. The outlet preferably comprises a venting passage, which must be of much greater flow capacity than the spiral groove and this venting passage is preferably provided through the piston and leads from the chamber to a space in the cylinder on the side of the piston remote from the chamber. This passage is provided with a non-return valve which allows only outflow from the chamber so that the chamber is vented through the outlet as soon as the pressure of the air supply upstream of the spiral groove falls below the pressure in the chamber.

The disc in which the spiral groove is preferably formed is predetermined of stainless steel and the groove may be formed in it by a photo-etching technique. Alternatively the groove may be formed by electro-forming by the deposition on the disc of a layer of nickel with the groove formed in it by means of a photoresist. The disc may have a thickness of 100 microns and the nickel layer a thickness of 70 microns or less. The groove then has a depth equal to the thickness of the nickel layer. Generally the electro-forming technique gives better repeatability than photo-etching of the stainless steel. Both the electro-forming and the photo-etching techniques enable the groove to be formed in a spiral with closely spaced turns if required and this enables the groove to be provided with a great length upon a disc of relatively small diameter. It is in this way that long time delays of several minutes can be provided with a timer of a similar size to that of the previous form of timer which is, for example, 24×32 mm and 80 mm high. This enables the timer to be incorporated satisfactorily in a pneumatic logic circuit.

Figure 2:
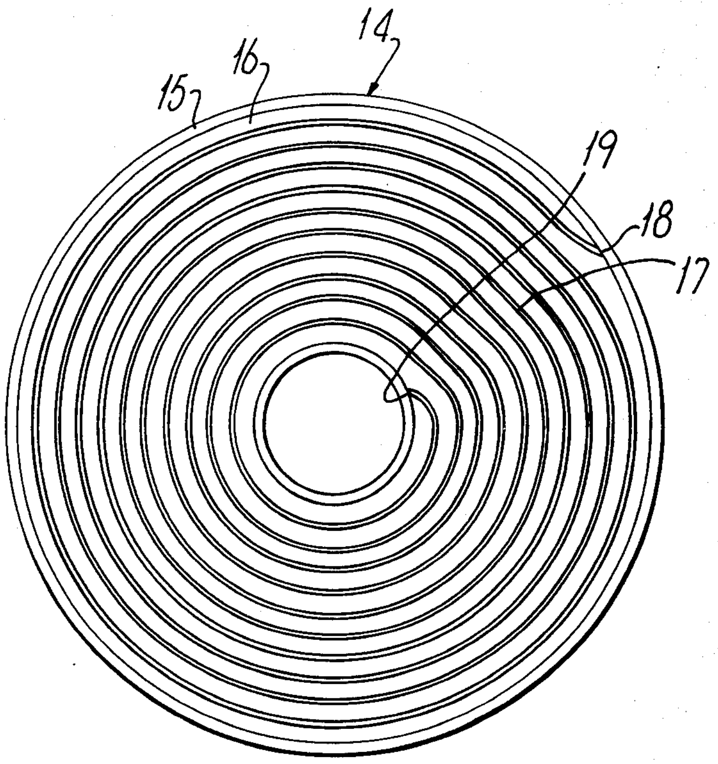

An example of a timer in accordance with the invention is illustrated in the accompanying drawings in which:

FIG. 1 is a sectional side view of the timer, the section being diammetric; and FIG. 2 is a plan view to a much larger scale of a spirally grooved disc which forms part of the timer.

The timer comprises a housing made in two parts 1 and 2 which are connected together by two self-tapping screws, which are not shown, but which extend through clearance holes in the part 2 and are screwed into bores in the part 1. The part 1 contains a cylinder 3 in which a piston 4 is slidable upwards and downwards and the part 2 contains a valve 5 the construction of which is not in itself novel.

The piston 4 is fixed by a self-tapping screw 6 to the bottom end of a spindle 7 with a screw thread 8. The screw thread 8 is screwed into a rotatable sleeve 9 the upper end of which is fitted with a control knob 10, which is only indicated in chain-dotted outline. Thus by rotating the sleeve 9 by means of the knob 10, the spindle 7 is screwed into or out of the sleeve 9, which is itself retained axially in position, so that the piston 4 is moved upwards or downwards within the cylinder 3. The piston 4 is shown in FIG. 1 in an intermediate position between its lowermost position adjacent the part 2 and an uppermost position in which the bottom end of the screw thread 8 reaches the bottom end of the sleeve 9.

The space within the cylinder 3 below the piston 4 forms a chamber 11 of the timer and the volume of this chamber can be varied over wide limits by moving the piston 4 upwards or downwards as already described. The bottom of the chamber 11 is bounded by a diaphragm 12 which is made of synthetic elastomeric material and has its sides sandwiched between the parts 1 and 2 of the housing.

The piston 4 is sealed within the cylinder 3 by an O-ring 13 and immediately above the piston 4 on the lower end of the spindle 7 is a thin annular disc 14, which is shown in detail in FIG. 2 and which comprises a backing disc 14 of stainless steel and an electro-formed layer of nickel 16 applied to the backing disc. The layer 16 is electro-formed with a spiral groove 17 which has one end 18 adjacent the outer periphery 15 of the disc 14 and an inner end 19 adjacent the inner periphery of the disc 14. The backing disc 14 has a thickness of 100 microns and the layer 16 has a thickness of 70 microns. The spiral groove 17 penetrates right through the layer 16 and accordingly has a depth of 70 microns. The groove 17 is straight sided and had a width of approximately 150 microns. The groove 17 may alternatively be directly formed in the stainless steel disc 14 by photo-etching.

The disc 14 is sandwiched between a lapped top surface of the piston 4 and a lapped under surface of a sealing washer 20 which closes the top of the groove 17 and thus causes the groove 17 to form an open-ended spiral passage of a length which is very great compared with its cross sectional dimensions. The sealing washer 20 has a clearance within the cylinder 3 and there is also a clearance between the inner periphery of the piston 4 and of the washer 20 and a spigot portion 21 at the bottom of the spindle 7. The clearance around the spigot portion 21 communicates with the chamber 11 via a crenellated washer 21' under the head of the screw 6 and accordingly the space above the piston 4 communicates with the chamber 11 through the long spiral groove 17.

Above the sealing washer 20 is a non-return valve closure member 22 consisting of a relatively rigid collar part 23 and a thin resilient flange part 24 having a lip which seals against the upper surface of the washer 20. The part 23 together with the washer 20 and the piston 4 are clamped between the head of the screw 6 and a flange 25 which is integral with the spindle 7. However, there are a number of grooves in the bottom edge of the part 23 forming a passage from the clearance space surrounding the spigot 21 to the underside of the flange part 24. Thus when there is a greater air pressure in the space above the piston 4 than there is in the chamber 11, air flows into the chamber 11 from the space above the piston only through the spiral groove 17. However, when the pressure above the piston 4 is lower than the pressure in the chamber 11, the excess pressure causes the flange part to deflect upwards so that the lip is moved out of contact with the washer 20 and the air can thus escape relatively freely from the chamber 11 without having to pass through the groove 17.

A pilot air inlet duct 26 extends through the housing parts 1 and 2 through a port 27 into the space within the cylinder 3 above the piston 4. An indicator button 28 is provided to enable the presence or absence of pilot air under pressure in the duct 26 to be sensed. The button 28 is pressed downwards and if pilot air is present, the button pops up again, but if there is no pilot air pressure, the button remains depressed.

When a signal in the form of pilot air under pressure is supplied through the duct 26, the timing period set by the timer starts and the length of the timing period is dependent upon the volume of the chamber 11. This period can be made very short indeed by turning the knob 10 until the underside of the piston 4 comes into contact with the diaphragm 12, and it can be increased from this low value by raising the piston 4.

As already mentioned, the valve 5 which is operated by downward movement of the diaphragm 12, which forms the member which is mounted in the wall of the chamber, is conventional and it may take various forms. In the illustrated example, however, the valve 5 comprises a lower valve closure member 29 which has a sealing washer 30 which, when the valve is closed as shown, seals against a seat 31. The lower closure member 29 is connected by a spindle 32 of cruciform section to an upper closure member 33 with a sealing washer 34 with a second seat 35 below it.

The valve 5 has an air inlet 36 and air supplied under pressure through this inlet acts on the underside of the closure member 29 and holds the sealing washer 30 on the seat 31. The valve is thus closed. When pilot air is supplied through the duct 26, it flows from the space above the piston 4 through the spiral groove 17 into the chamber 11 and after a time which is set by adjusting the position of the piston 4, the pressure in the chamber 11 reaches a magnitude such that the diaphragm 12 acting over the area of the closure member 33 presses the closure member 33 downwards and moves the sealing washer 30 off its seat 31. At the same time the sealing washer 34 is moved onto the seat 35. When this happens, the air supplied through the inlet 36 passes around the closure member 29 and along the cruciform spindle 32 to a cross-duct 37. Thence the air flows to an outlet 38. A further duct 39 extends upwards from the cross-duct 37 and is provided with an indicator button 40, which operates in the same way as the button 28 to provide an indication of whether or not there is an air pressure output from the valve 5.

The valve 5 remains open so long as pilot air is supplied through the inlet 26, but as soon as the pilot air supply ceases and the pilot air is exhausted from the space above the piston 4 through the duct 26, the pressure in the chamber 11 will also drop since the chamber is exhausted through the non-return valve 24 in the manner already described. As soon as the pressure in the chamber 11 has dropped to a predetermined value, the valve 5 is closed again by upward movement of the closure member 29 under the pressure of the air supply through the inlet 36.

The illustrated example of the timer in accordance with the invention has the following advantages over the previous form of timer initially described:

(a) It is cheaper and easier to manufacture and assemble;

(b) It has a much more accurate time delay setting;

(c) Much longer time delays are obtainable;

(d) The repeatability of the timers when produced in volume is much better; and (e) The appearance is improved.

I claim:

1. In a variable pneumatic timer for operating a pneumatic valve, said timer comprising a cylinder (3) and a piston (4) in said cylinder, said cylinder and piston defining an air chamber (11), means (7–10) for adjusting the position of said piston in said cylinder to vary the volume of said chamber, means defining an air inlet for the supply of air to said chamber, a throttling device in said inlet to control the rate of air flow into said chamber, a pneumatic valve (5), a member (12) for controlling said pneumatic valve, and means movably mounting said member in a wall of said chamber whereby said member is moved to operate said valve when a predetermined air pressure is reached in said chamber, the improvement wherein said throttling device comprises a disc (14), means (16) defining a substantially spiral groove (17) in a flat face of said disc, a seal (20) applied to said flat face of said disc to enclose said groove and form a substantially spiral open ended passage, and means incorporating said disc in said piston, and said inlet leading to a space in said cylinder on a side of said piston remote from said chamber.

2. A timer as claimed in claim 1, in which said member in said wall is a diaphragm, said diaphragm extending over that end of said cylinder in which said chamber is provided, and in which said pneumatic valve includes a valve member, said diaphragm being in operative engagement with said valve member.

3. A timer as claimed in claim 2, further comprising a housing containing said cylinder, said pneumatic valve being mounted in said housing, and further comprising means defining an air inlet to said valve, whereby air pressure supplied to said air inlet to said valve holds said valve member in one of an open position and a closed position against air pressure in said chamber acting on said diaphragm.

4. A timer as claimed in claim 3, in which said valve member is held in said closed position and is moved to said open position by said diaphragm when said predetermined air pressure is reached in said chamber, said valve being so constructed whereby after said valve member has been moved to said open position by said diaphragm, said valve member remains in said open position so long as a supply of air to said inlet to said chamber is maintained, and said timer further comprising means defining a venting passage from said chamber to enable said valve member to be moved back to said closed position when said air supply to said inlet to said chamber ceases.

5. A timer as claimed in claim 4, in which said venting passage extends through said piston and leads from said chamber to a space in said cylinder on the side of said piston remote from said chamber, and further comprising a non-return valve in said venting passage, said non-return valve allowing only air flow through said venting passage from said chamber to said space.

6. A timer as claimed in claim 1, in which said disc in which said spiral groove is formed is of stainless steel and said groove is photo-etched.

7. A timer as claimed in claim 1, in which said disc is of stainless steel and said means defining said groove comprises a layer of nickel electro-deposited on said disc, said groove being electro-formed, in said layer.

8. A timer as claimed in claim 1, in which said means for adjusting the position of said piston in said cylinder comprises a spindle extending from said piston, a screw-thread on said spindle, a sleeve, a screw-thread in said sleeve, said screw-thread on said spindle meshing with said screw-thread in said sleeve, and rotatable knob means for rotating said sleeve.

9. In a variable pneumatic timer for operating a pneumatic valve, said timer comprising a cylinder (3) and a piston (4) in said cylinder, said cylinder and piston defining an air chamber (11), means (7–10) for adjusting the position of said piston in said cylinder to vary the volume of said chamber, means defining an air inlet for the supply of air to said chamber, a throttling device in said inlet to control the rate of air flow into said chamber, a pneumatic valve (5), a member (12) for controlling said pneumatic valve, and means movably mounting said member in a wall of said chamber whereby said member is moved to operate said valve when a predetermined air pressure is reached in said chamber, said throttling device comprising means defining an elongated substantially spiral open-ended passage, said means defining said passage comprising a flat faced member (14), means (16) defining a substantially spiral groove (17) in said flat faced member and a seal (20) applied to said flat faced member to enclose said groove, said member in said wall being a diaphragm, which extends over that end of said cylinder in which said chamber is provided, said pneumatic valve including a valve member, said diaphragm being in operative engagement with said valve member, a housing containing said cylinder, said pneumatic valve being mounted in said housing, means defining an air inlet to said valve, whereby air pressure supplied to said air inlet to said valve holds said valve member in one of an open position and a closed position against air pressure in said chamber acting on said diaphragm, said valve member being held in said closed position and being moved to said open position by said diaphragm when said predetermined air pressure is reached in said chamber, said valve being so constructed whereby after said valve member has been moved to said open position by said diaphragm, said valve member remains in said open position so long as a supply of air to said inlet to said chamber is maintained, said timer further comprising means defining a venting passage from said chamber to enable said valve member to be moved back to said closed position when said air supply to said inlet to said chamber ceases, said venting passage extending through said piston and leading from said chamber to a space in said cylinder on the side of said piston remote from said chamber, and a non-return valve in said venting passage, said non-return valve allowing only air flow through said venting passage from said chamber to said space.

10. A timer as claimed in claim 9, in which said flat faced member is a disc, and further comprising means incorporating said disc in said piston, and in which said inlet leads to a space in said cylinder on the side of said piston remote from said chamber.

11. A timer as claimed in claim 10, in which said disc in which said spiral groove is formed is of stainless steel and said groove is photo-etched.

12. A timer as claimed in claim 10, in which said disc is of stainless steel and said means defining said groove comprises a layer of nickel electro-deposited on said disc, said groove being electro-formed, in said layer.

13. A timer as claimed in claim 9, in which said means for adjusting the position of said piston in said cylinder comprises a spindle extending from said piston, a screw-thread on said spindle, a sleeve, a screw-thread in said sleeve, said screw-thread on said spindle meshing with said screw-thread in said sleeve, and rotatable knob means for rotating said sleeve.

* * * * *